(12) United States Patent
Lee et al.

(10) Patent No.: US 11,569,501 B2
(45) Date of Patent: Jan. 31, 2023

(54) POSITIVE ELECTRODE FOR SECONDARY BATTERY AND SECONDARY BATTERY INCLUDING THE SAME

(71) Applicant: LG Chem, Ltd., Seoul (KR)

(72) Inventors: Dong Hun Lee, Daejeon (KR); Hye Lim Jeon, Daejeon (KR); Sang Wook Lee, Daejeon (KR); Eun Sol Lho, Daejeon (KR); Wang Mo Jung, Daejeon (KR); Min Suk Kang, Daejeon (KR); So Ra Baek, Daejeon (KR); Ji Young Park, Daejeon (KR)

(73) Assignee: LG Energy Solution, Ltd.

( * ) Notice: Subject to any disclaimer, the term of this patent is extended or adjusted under 35 U.S.C. 154(b) by 196 days.

(21) Appl. No.: 16/647,935

(22) PCT Filed: Sep. 19, 2018

(86) PCT No.: PCT/KR2018/011082
§ 371 (c)(1),
(2) Date: Mar. 17, 2020

(87) PCT Pub. No.: WO2019/059655
PCT Pub. Date: Mar. 28, 2019

(65) Prior Publication Data
US 2020/0266433 A1 Aug. 20, 2020

(30) Foreign Application Priority Data

Sep. 19, 2017 (KR) .................. 10-2017-0120694
Sep. 18, 2018 (KR) .................. 10-2018-0111643

(51) Int. Cl.
*H01M 4/485* (2010.01)
*H01M 10/0525* (2010.01)
*H01M 4/58* (2010.01)
*H01M 4/02* (2006.01)

(52) U.S. Cl.
CPC ............ *H01M 4/485* (2013.01); *H01M 4/58* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2014/0363736 A1 | 12/2014 | Kim et al. | |
| 2015/0147630 A1* | 5/2015 | Nakano ................. | H01M 4/628 |
| | | | 429/156 |
| 2017/0155135 A1* | 6/2017 | Sugiura ................. | H01M 4/366 |
| 2018/0219250 A1 | 8/2018 | Delobel et al. | |

FOREIGN PATENT DOCUMENTS

| CN | 103441236 A | | 12/2013 |
| JP | H04329269 A | | 11/1992 |
| JP | 2000077061 A | * | 3/2000 |
| JP | 2000077061 A | | 3/2000 |
| JP | 2006260990 A | | 9/2006 |
| JP | 2008226693 A | | 9/2008 |
| JP | 4236308 B2 | | 3/2009 |
| JP | 2009277397 A | | 11/2009 |
| JP | 2015069898 A | | 4/2015 |
| JP | 2015088370 A | | 5/2015 |
| JP | 2015213004 A | | 11/2015 |
| JP | 2016076439 A | | 5/2016 |
| JP | 2018526788 A | | 9/2018 |
| KR | 20070105724 A | | 10/2007 |
| KR | 101558774 B1 | | 10/2015 |
| KR | 20170103184 A | * | 9/2017 |
| KR | 20170103184 A | | 9/2017 |
| WO | 2017037363 A1 | | 3/2017 |

OTHER PUBLICATIONS

Search report from International Application No. PCT/KR2018/011082, dated Mar. 22, 2019.
Shanmukaraj, D., et al., "Sacrificial Salts: Compensating the Initial Charge Irreversiblity in Lithium Batteries." Electrochemistry Communications, vol. 12, Received Jun. 22, 2010; Accepted Jul. 12, 2010; Available online Jul. 18, 2010, pp. 1344-1347.
Extended European Search Report including Written Opinion for EP18859067.3 dated Jul. 21, 2020; 7 pages.
Search Report dated Aug. 9, 2022 from the Office Action for Chinese Application No. 201880059198.7 dated Aug. 15, 2022, 2 pages.

* cited by examiner

*Primary Examiner* — Zhongqing Wei
(74) *Attorney, Agent, or Firm* — Lerner, David, Littenberg, Krumholz & Mentlik, LLP

(57) ABSTRACT

Provided are various embodiments of a positive electrode for a secondary battery, which in one embodiment includes a first positive electrode material mixture layer formed on a positive electrode collector, and a second positive electrode material mixture layer formed on the first positive electrode material mixture layer, wherein the first positive electrode material mixture layer has an operating voltage of 4.25 V to 6.0 V and includes an active material for overcharge which generates lithium and gas during charge; a method of preparing such a positive electrode for a secondary battery; and a lithium secondary battery including such a positive electrode.

6 Claims, No Drawings

POSITIVE ELECTRODE FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Application No. PCT/KR2018/011082 filed on Sep. 19, 2018, the disclosure of which is incorporated herein in its entirety by reference, which claims priority to Korean Patent Application Nos. 10-2017-0120694, filed on Sep. 19, 2017, and 10-2018-0111643, filed on Sep. 18, 2018, in the Korean Intellectual Property Office, the disclosures of which are incorporated herein in their entirety by reference.

TECHNICAL FIELD

The present disclosure relates to a positive electrode for a secondary battery and a secondary battery including the same.

BACKGROUND ART

Demand for secondary batteries as an energy source has been significantly increased as technology development and demand with respect to mobile devices have increased. Among these secondary batteries, lithium secondary batteries having high energy density and voltage, long cycle life, and low self-discharging rate have been commercialized and widely used.

However, with respect to the lithium secondary battery, it may be overcharged beyond a normal charge region, and this phenomenon is referred to as "overcharge phenomenon". In a case in which the lithium secondary battery is overcharged above a normal operating voltage, heat is generated due to electrical resistance in the battery to gradually increase the temperature, wherein, in this case, since an excess amount of lithium is discharged from a positive electrode in comparison to a normal charge state and an amount of lithium, which is more than an amount of lithium that may be accommodated, is introduced into a negative electrode, the excess lithium is precipitated in the form of lithium metal on the surface of the negative electrode. Also, structural collapse occurs in the positive electrode during overcharge to provide oxygen as well as thermal energy, and, when a separator is melted by heat rapidly generated from the positive electrode and the negative electrode, the positive electrode and the negative electrode may be in a state in which an internal short occurs. When this state is reached, the battery becomes extremely dangerous and may even explode.

Thus, in order to solve the above-mentioned problems, research into a method of further including an additive, such as an overcharge inhibitor, in an electrolyte solution and development of related materials have been actively studied. However, even if the electrolyte solution includes the inhibitor, there is a limitation in that it is difficult to prevent an exothermic phenomenon of the positive electrode or the negative electrode in advance.

An overshooting phenomenon occurs in which the voltage increases as the resistance increases during overcharge. However, there is a limitation in that stability of a battery, in which safety is not ensured, is reduced because the battery generates heat or explodes before the occurrence of the overshooting phenomenon.

Technical Problem

An aspect of the present disclosure provides a positive electrode for a secondary battery which may prevent explosion or heat generation of the battery due to heat accumulated in the battery before reaching an overcharge reference voltage (about 8 V to 10 V).

Technical Solution

According to an aspect of the present disclosure, there is provided a positive electrode for a secondary battery including: a first positive electrode material mixture layer formed on a positive electrode collector; and a second positive electrode material mixture layer formed on the first positive electrode material mixture layer, wherein the first positive electrode material mixture layer has an operating voltage of 4.25 V to 6.0 V and includes an active material for overcharge which generates lithium and gas during charge.

According to another aspect of the present disclosure, there is provided a method of preparing a positive electrode for a secondary battery which includes: forming a first positive electrode material mixture layer on a positive electrode collector; and forming a second positive electrode material mixture layer on the first positive electrode material mixture layer, wherein the first positive electrode material mixture layer has an operating voltage of 4.25 V to 6.0 V and includes an active material for overcharge which generates lithium and gas during charge.

According to another aspect of the present disclosure, there is provided a secondary battery including the positive electrode for a secondary battery.

Advantageous Effects

A positive electrode for a secondary battery according to the present disclosure includes a material mixture layer including an active material for overcharge which generates lithium and gas when the battery is operated and charged in an overcharge voltage range higher than an operating voltage range of a general lithium secondary battery. Thus, since resistance and voltage of the battery rapidly increase before the battery is damaged or exploded due to residual heat accumulated in the battery and an exothermic phenomenon during overcharge of the secondary battery, lifetime characteristics and safety of the battery may be improved.

MODE FOR CARRYING OUT CERTAIN EMBODIMENTS OF THE PRESENT DISCLOSURE

Hereinafter, various embodiment of the present disclosure will be described in more detail to allow for a clearer understanding of the present disclosure. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that one may properly define the meaning of the words or terms to best explain the present disclosure.

When a secondary battery is overcharged, there is a limitation in that the secondary battery is exploded or ignited by heat generated due to an oxidative decomposition reaction of an electrolyte solution and heat accumulated in the battery. However, whether or not the second battery is overcharged is generally evaluated based on whether the voltage of the secondary battery reaches a high voltage of about 8 V to 10 V, wherein there is a limitation in that stability of the battery is reduced because the battery is exploded or ignited due to an exothermic phenomenon caused by decomposition of an electrolyte before the voltage is rapidly increased.

Thus, the present inventors stacked an active material layer for overcharge, which may generate lithium and gas in a voltage range higher than a voltage at which a battery is generally operated and lower than a voltage range in which oxidative decomposition of the electrolyte solution begins during overcharge, on one surface of a positive electrode. Accordingly, the present inventors devised a positive electrode for a secondary battery in which, when the battery is charged within the above voltage range, gas is generated to rapidly increase resistance and the voltage may be rapidly increased in proportion thereto.

In a case in which the positive electrode, on which a layer composed of a positive electrode active material for overcharge is formed, according to the present disclosure is used, since a voltage of the positive electrode is rapidly increased due to an increase in resistance caused by a reaction of the positive electrode active material for overcharge before an exothermic reaction occurs due to the decomposition of the electrolyte solution in a process of reaching an electrode in an overcharge range, the voltage reaches a voltage range corresponding to a termination condition voltage, and thus, a positive electrode for a secondary battery, which may prevent heat generation or explosion due to the oxidative decomposition reaction of the electrolyte solution, a method of preparing the same, and a secondary battery including the positive electrode may be provided.

Positive Electrode for Secondary Battery

Hereinafter, a positive electrode for a secondary battery according to the present disclosure will be described.

The positive electrode for a secondary battery according to the present disclosure includes a first positive electrode material mixture layer formed on a positive electrode collector; and a second positive electrode material mixture layer formed on the first positive electrode material mixture layer, wherein the first positive electrode material mixture layer has an operating voltage of 4.25 V to 6.0 V and includes an active material for overcharge which generates lithium and gas during charge.

In the present disclosure, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the positive electrode collector to improve the adhesion of the positive electrode active material. The positive electrode collector, for example, may be used in various shapes such as that of a film, a sheet, a foil, a net, a porous body, a foam body, a non-woven fabric body, and the like.

The first positive electrode material mixture layer formed on the positive electrode collector may have an operating voltage of 4.25 V to 6.0 V and may include an active material for overcharge which generates lithium and gas during charge.

In the present disclosure, the expression "operating voltage" denotes a voltage range in which the active material for overcharge generates lithium and gas when the voltage reaches the above range, wherein the operating voltage is not necessarily limited to the above range, but it may be regarded as the operating voltage range of the first positive electrode material mixture layer if it is a voltage range higher than a voltage range, in which a secondary battery is generally operated, and lower than a voltage at which reaction heat is generated by oxidative decomposition of an electrolyte solution.

In the present disclosure, the active material for overcharge may include at least one element selected from the group consisting of a carbon element and a nitrogen element. In a case in which the active material for overcharge includes the carbon element and/or the nitrogen element, the active material for overcharge is vaporized while generating carbon monoxide (CO) and/or carbon dioxide ($CO_2$) within the above operating voltage range. Since a part of positive electrode components is lost at the same time as the active material for overcharge included in the first positive electrode material mixture layer is vaporized while generating gas, positive electrode resistance is rapidly increased. Accordingly, since a voltage of the positive electrode is also increased in proportion to the positive electrode resistance, the electrolyte solution is oxidatively decomposed, and thus, the supply of the voltage is stopped before heat is generated inside the secondary battery.

In an embodiment of the present disclosure, the active material for overcharge may include at least one selected from the group consisting of $Li_2C_2O_4$, $Li_2C_4O_4$, $Li_2C_3O_5$, $Li_2C_4O_6$, and $LiN_3$, and, particularly, as a material highly sensitive to the reaction within the specific operating voltage range, the active material for overcharge may more preferably be $Li_2C_2O_4$.

In the present disclosure, the active material for overcharge may be included in an amount of 60 wt % to 99.9 wt %, preferably 65 wt % to 99.8 wt %, and more preferably 70 wt % to 99.8 wt % based on a total weight of the first positive electrode material mixture layer. In a case in which the active material for overcharge is included in an amount within the above range, since lithium and gas are sufficiently generated when the voltage within the operating voltage range is applied to the battery, the resistance and voltage may be increased above a certain level. Also, in the case that the active material for overcharge is included in an amount within the above range, capacity of the battery may be relatively increased. Thus, it is desirable that the active material for overcharge is included in an amount within the above range.

In the present disclosure, the first positive electrode material mixture layer has a thickness of 0.1 μm to 30 μm, for example, 0.2 μm to 10 μm. In a case in which the thickness of the first positive electrode material mixture layer is smaller than the above range, since an amount of the gas generated is small even if the voltage supplied to the battery reaches a voltage within the operating range to generate lithium and gas and, accordingly, a degree of increasing the resistance is also low, it is difficult to rapidly increase the voltage of the positive electrode. In a case in which the first positive electrode material mixture layer is formed to a thickness greater than the above range, since charge/discharge performance of the electrode may be degraded and a portion of the first positive electrode material mixture layer is present on the positive electrode even after the voltage supplied to the battery reaches the voltage within the operating range, the resistance of the positive electrode may not be rapidly increased and the oxidative decomposition reaction of the electrolyte may be continuously induced, and thus, stability of the battery may be reduced by the exothermic reaction.

In the present disclosure, the first positive electrode material mixture layer may further include a binder and a conductive agent in addition to the above-described active material for overcharge.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used.

The binder may be included in an amount of 0.1 wt % to 40 wt %, preferably 0.1 wt % to 35 wt %, and more preferably 0.1 wt % to 30 wt % based on the total weight of the first positive electrode material mixture layer. When the binder is included in an amount less than the above range, since the adhesion between the first positive electrode material mixture layer and the positive electrode collector is weak, life characteristics of the battery may be degraded. In a case in which the binder is included in an amount greater than the above range, since viscosity may be increased during a process of forming the first positive electrode material mixture layer or materials constituting the first positive electrode material mixture layer may be agglomerated to each other, the first positive electrode material mixture layer is not uniformly formed, and thus, the life characteristics of the battery may be degraded. Therefore, it is desirable that the binder is included in an amount within the above range.

Also, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used.

The conductive agent may be included in an amount of 0.1 wt % to 40 wt %, preferably 0.1 wt % to 35 wt %, and more preferably 0.1 wt % to 30 wt % based on the total weight of the first positive electrode material mixture layer. In a case in which the conductive agent is included in an amount within the above range, conductivity above a predetermined level may be provided to the electrode. However, in a case in which the conductive agent is included in an amount less than the above range, it is difficult to provide the conductivity above a predetermined level to the electrode, and, in a case in which the conductive agent is included in an amount greater than the above range, since an agglomeration phenomenon of the conductive agent occurs, the first positive electrode material mixture layer is not uniformly formed, and thus, the life characteristics of the battery may be degraded. Therefore, it is desirable that the conductive agent is included in an amount within the above range.

In the present disclosure, the second positive electrode material mixture layer is a layer formed on the first positive electrode material mixture layer, wherein it includes a lithium transition metal oxide as a positive electrode active material.

Specifically, as the lithium transition metal oxide, at least one selected from the group consisting of $Li_{x1}CoO_2$ ($0.5<x_1<1.3$), $Li_{x2}NiO_2$ ($0.5<x_2<1.3$), $Li_{x3}MnO_2$ ($0.5<x_3<1.3$), $Li_{x4}Mn_2O_4$ ($0.5<x_4<1.3$), $Li_{x5}(Ni_{a1}Co_{b1}Mn_{c1})O_2$ ($0.5<x_5<1.3$, $0<a_1<1$, $0<b_1<1$, $0<c_1<1$, $a_1+b_1+c_1=1$), $Li_{x6}Ni_{1-y1}Co_{y1}O_2$ ($0.5<x_6<1.3$, $0<y_1<1$), $Li_{x7}Co_{1-y2}Mn_{y2}O_2$ ($0.5<x_7<1.3$, $0\leq y_2<1$), $Li_{x8}Ni_{1-y3}Mn_{y3}O_2$ ($0.5<x_8<1.3$, $O\leq y3<1$), $Li_{x9}(Ni_{a2}Co_{b2}Mn_{c2})O_4$ ($0.5<x_9<1.3$, $0<a_2<2$, $0<b_2<2$, $0<c_2<2$, $a_2+b_2+c_2=2$), $Li_{x10}Mn_{2-z1}Ni_{z1}O_4$ ($0.5<x_{10}<1.3$, $0<z_1<2$), $Li_{x11}Mn_{2-z}Co_zO_4$ ($0.5<x_{11}<1.3$, $0<z<2$), $Li_{x12}CoPO_4$ ($0.5<x_{12}<1.3$), $Li_{x13}FePO_4$ ($0.5<x_{13}<1.3$), and $Li_{1+a3}[Ni_{x14}Mn_{y3}Co_{z2}M_{v1}]O_{(2-c)}A_{c3}$ (where M is any one selected from the group consisting of aluminum (Al), zirconium (Zr), zinc (Zn), titanium (Ti), magnesium (Mg), gallium (Ga), and indium (In) or two or more elements thereof; A is at least one selected from the group consisting of phosphorus (P), fluorine (F), sulfur (S), and nitrogen (N), $0\leq x_{14}\leq 1.0$, $0\leq y_3<0.6$, $0\leq z_2<0.6$, $0\leq v_1<0.1$, $0\leq a_3<0.3$, $0\leq c_3<0.2$, and $a_3+x_{14}+y_3+z_2+v_1=1$) may be used.

In the present disclosure, the second positive electrode material mixture layer may also further include a binder and a conductive agent, the binder and conductive agent used in the second positive electrode material mixture layer are the same types as the binder and conductive agent used in the first positive electrode material mixture layer, and the types of the binder and conductive agent are the same as those described above.

With respect to the second positive electrode material mixture layer, when the lithium transition metal oxide, the binder, and the conductive agent are included, the lithium transition metal oxide may be included in an amount of 80 wt % to 99.9 wt %, preferably 85 wt % to 99.8 wt %, and more preferably 90 wt % to 99.8 wt % based on a total weight of the second positive electrode material mixture layer.

The binder may be included in an amount of 0.1 wt % to 20 wt %, preferably 0.1 wt % to 15 wt %, and more preferably 0.1 wt % to 10 wt % based on the total weight of the second positive electrode material mixture layer.

The conductive agent may be included in an amount of 0.1 wt % to 20 wt %, preferably 0.1 wt % to 15 wt %, and more preferably 0.1 wt % to 10 wt % based on the total weight of the second positive electrode material mixture layer.

In a case in which the lithium transition metal oxide is included in an amount less than the above range, lithium ions may not be sufficiently supplied to a negative electrode, and, in a case in which the lithium transition metal oxide is included in an amount greater than the above range, performance of the battery may be degraded due to insufficient conductivity and adhesion of the electrode. Thus, it is more desirable that the lithium transition metal oxide is included in an amount within the above range in consideration of capacity and life performance of the battery. With respect to the second positive electrode material mixture layer, in a case in which the binder and conductive agent are respectively included in amounts within the above ranges, adhesion between the first positive electrode material mixture layer and the second positive electrode material mixture layer may be improved and conductivity may also be maintained above a predetermined level. However, in a case in which the binder is included in an amount less than the above range, the adhesion between the first positive electrode material mixture layer and the second positive electrode material mixture layer may be reduced, and, in a case in which the conductive agent is included in an amount less than the above range, the conductivity of the second positive electrode material mixture layer may also be reduced. Furthermore, in a case in which the binder and conductive agent are respectively included in amounts greater than the above ranges, since an agglomeration phenomenon of materials constituting the second positive electrode material mixture layer occurs, the adhesion to the first positive electrode material mixture layer may be rather reduced, and thus, the life characteristics of the battery may be degraded. Therefore, it is more desirable that the binder and conductive agent are respectively included in amounts within the above ranges.

In the present disclosure, the second positive electrode material mixture layer has a thickness of 20 μm to 500 μm, for example, 50 μm to 300 μm. In a case in which the thickness of the second positive electrode material mixture layer is less than the above range, lithium ions may not be sufficiently supplied into the battery, and, in a case in which the thickness of the second positive electrode material mixture layer is greater than the above range, since the life characteristics and stability of the battery may be rather reduced while a total thickness of the positive electrode is increased, it is more desirable that the thickness of the second positive electrode material mixture layer formed is within the above range.

In the present disclosure, a thickness ratio of the first positive electrode material mixture layer to the second positive electrode material mixture layer is in a range of 1:1 to 1:300, for example, 1:50 to 1:200. In a case in which the thickness ratio of the first positive electrode material mixture layer to the second positive electrode material mixture layer is within the above range, the life performance and stability of the battery may be improved because the first positive electrode material mixture layer is formed to rapidly increase the resistance and voltage, and the capacity of the battery may also be improved because the lithium ions are sufficiently supplied.

When the lithium secondary battery including the positive electrode according to the embodiment of the present disclosure is in a state of overcharge, an electrical contact between the positive electrode collector and the second positive electrode material mixture layer may be interrupted by structural collapse of the first positive electrode material mixture layer. Such structural collapse of the first positive electrode material mixture layer may occur before the positive electrode collector, the separator, or other structures in the battery can collapse. Such preemptive collapse of the first positive electrode material mixture layer may serve to protect the integrity of the remainder of the positive electrode structure, and the battery overall, which may decrease the risk, substantially minimize or eliminate the risk, or completely eliminate the risk of the battery achieving a dangerous state, and thus, the risk of an explosion.

Method of Preparing Positive Electrode for Secondary Battery

Hereinafter, a method of preparing the positive electrode for a secondary battery according to the present disclosure will be described.

In the present disclosure, the method includes the steps of: (1) forming a first positive electrode material mixture layer on a positive electrode collector; and (2) forming a second positive electrode material mixture layer on the first positive electrode material mixture layer, wherein the first positive electrode material mixture layer has an operating voltage of 4.25 V to 6.0 V and includes an active material for overcharge which generates lithium and gas during charge.

(1) First Positive Electrode Material Mixture Layer-Forming Step

A method of forming the first positive electrode material mixture layer including the active material for overcharge is not particularly limited. However, more preferably, the forming of the first positive electrode material mixture layer may include mixing the active material for overcharge with a conductive agent and a binder to form a composition for forming a first positive electrode; and coating the composition for forming a first positive electrode on a positive electrode collector.

The composition for forming a first positive electrode may be prepared by dissolving or dispersing the active material for overcharge, the conductive agent, and the binder in a solvent. Types and amounts of the active material for overcharge, the conductive agent, and the binder are the same as those previously described.

The solvent for forming the composition for forming a first positive electrode may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the active material for overcharge, the conductive agent, and the binder in consideration of a coating thickness of the slurry and manufacturing yield, and may allow to have a viscosity that may provide excellent thickness uniformity during the subsequent coating for the preparation of the positive electrode.

Next, the composition for forming a first positive electrode is coated on the positive electrode collector, and the first positive electrode material mixture layer may then be prepared by drying and rolling the coated positive electrode collector.

As another method, the first positive electrode material mixture layer may be prepared by casting the composition for forming a first positive electrode on a separate support and then laminating a film separated from the support on the positive electrode collector.

(2) Second Positive Electrode Material Mixture Layer-Forming Step

In the present disclosure, the second positive electrode material mixture layer is formed on the first positive electrode material mixture layer, wherein a method of forming the second positive electrode material mixture layer is not particularly limited.

However, the second positive electrode material mixture layer may be formed by including: mixing the lithium transition metal oxide with a conductive agent and a binder to form a composition for forming a second positive electrode; and coating the composition for forming a second positive electrode on the first positive electrode material mixture layer.

The composition for forming a second positive electrode, which includes the lithium transition metal oxide as well as selectively the binder and the conductive agent, is coated on the first positive electrode material mixture layer formed on the positive electrode collector, and the second positive electrode material mixture layer may then be prepared by drying and rolling the coated positive electrode collector.

In this case, types and amounts of the lithium transition metal oxide, the binder, and the conductive, and a solvent for forming the composition for forming a second positive electrode are the same as those previously described.

Lithium Secondary Battery

Hereinafter, a lithium secondary battery according to the present disclosure will be described.

The lithium secondary battery according to the present disclosure specifically includes a positive electrode, a negative electrode disposed to face the positive electrode, a separator disposed between the positive electrode and the negative electrode, and an electrolyte.

The positive electrode is the same as described above. Also, the lithium secondary battery may further selectively include a battery container accommodating an electrode assembly of the positive electrode, the negative electrode, and the separator, and a sealing member sealing the battery container.

The negative electrode includes a negative electrode collector and a negative electrode active material layer disposed on the negative electrode collector. The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer, for example, may be prepared by coating a composition for forming a negative electrode, which includes the negative electrode active material as well as selectively the binder and the conductive agent, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, y-butyrolactone, and E-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), fluoroethylene carbonate (FEC), and propylene carbonate (PC); an alcohol-based solvent such as ethyl alcohol and isopropyl alcohol; nitriles such as R-CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present disclosure stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Hereinafter, examples of the present disclosure will be described in detail in such a manner that it may easily be carried out by a person with ordinary skill in the art to which the present disclosure pertains. The disclosure may, however, be embodied in many different forms and should not be construed as being limited to the examples set forth herein.

EXAMPLES

Example 1

First Positive Electrode Material Mixture Layer Formation $Li_2C_2O_4$, a conductive agent (Denka Black KF1100), and a PVDF binder were mixed in a NMP solvent in a weight ratio of 90:5:5. The mixture thus obtained was dispersed for 30 minutes using a dispersion apparatus (paste mixer or homo disperser) to prepare a composition for forming a first positive electrode material mixture layer (solid content: about 70 wt %).

The composition for forming a first positive electrode material mixture layer prepared was coated on an aluminum current collector, dried at 120° C., and then rolled to form a first positive electrode material mixture layer on the aluminum current collector.

Positive Electrode Preparation

Thereafter, $LiNi_{0.6}Co_{0.2}Mn_{0.2}O_2$, a conductive agent (Denka Black KF1100), and a PVDF binder were mixed in a NMP solvent in a weight ratio of 96:2:2. After the mixture thus obtained was dispersed for 30 minutes using a dispersion apparatus (paste mixer or homo disperser) to prepare a composition for forming a second positive electrode material mixture layer (solid content: about 75 wt %), the composition for forming a second positive electrode material mixture layer was coated on the first positive electrode material mixture layer, dried at 120° C., and then rolled to prepare a positive electrode.

Example 2

A positive electrode was prepared in the same manner except that $Li_2C_4O_4$, instead of $Li_2C_2O_4$, was used when the composition for forming a first positive electrode material mixture layer was prepared in Example 1.

Example 3

A positive electrode was prepared in the same manner except that $LiN_3$, instead of $Li_2C_2O_4$, was used when the composition for forming a first positive electrode material mixture layer was prepared in Example 1.

Comparative Examples

Comparative Example 1

A positive electrode was prepared in the same manner except that the first positive electrode material mixture layer of Example 1 was not formed and instead the composition for forming a second positive electrode material mixture layer was directly coated on an aluminum current collector, dried at 120° C., and then rolled.

Comparative Example 2

A positive electrode was prepared in the same manner except that $Li_2CO_3$, instead of $Li_2C_2O_4$, was used when the composition for forming a first positive electrode material mixture layer was prepared in Example 1.

Comparative Example 3

$LiNi_{0.6}Co_{0.2}Mn_{0.2}O_2$, a conductive agent (Denka Black KF1100), and a PVDF binder were mixed in a NMP solvent in a weight ratio of 96:2:2. Also, $Li_2C_2O_4$ was added in an amount of 3 wt % and mixed. After the mixture thus obtained was dispersed for 30 minutes using a dispersion apparatus (paste mixer or homo disperser) to prepare a composition for forming a positive electrode material mixture layer (solid content: about 70 wt %), the composition for forming a positive electrode material mixture layer was coated on an aluminum current collector, dried at 120° C., and then rolled to form a positive electrode material mixture layer on the aluminum current collector.

Preparation Examples

A lithium secondary battery was prepared by using each of the positive electrodes prepared in Examples 1 to 3 and Comparative Examples 1 to 3. Specifically, the lithium secondary battery was prepared as follows.

Negative Electrode Preparation

Natural graphite as a negative electrode active material, a carbon black conductive agent, and carboxymethyl cellulose (CMC) and styrene-butadiene rubber (SBR), as a binder, were mixed in $H_2O$, as a solvent, in a weight ratio of 96:1:1:2 to prepare a negative electrode active material slurry. A copper current collector was coated with the negative electrode active material slurry, dried, and then rolled to prepare a negative electrode.

Lithium Secondary Battery Preparation

An electrode assembly was prepared by disposing a porous polyethylene separator between the negative electrode and each of the positive electrodes prepared in Examples 1 to 3 and Comparative Examples 1 to 3, and a lithium secondary battery was prepared by disposing the electrode assembly in a case and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Experimental Examples: Battery Overcharge Safety Test

Experimental Example 1

The lithium secondary batteries prepared by using the positive electrodes of Examples 1 to 3 and Comparative Examples 1 to 3 were charged under charging conditions of the following Table 1 to measure voltages (operating voltages (V) of first positive electrode material mixture layers) at the time of gas generation. The operating voltages measured in this case are listed in the following Table 1.

TABLE 11

|  | Charging conditions | Operating voltage of first positive electrode material mixture layer (V) |
| --- | --- | --- |
| Example 1 | 0.1 C @ 25° C. | 5.0 V ~ 5.2 V |
| Example 2 | 0.1 C @ 25° C. | 4.25 V ~ 6 V |
|  | 1.0 C @ 25° C. | 4.5 V ~ 6 V |
|  | 1.0 C @ 60° C. | 4.25 V ~ 5.4 V |
| Example 3 | 1.0 C @ 25° C. | 5.0 V ~ 5.8 V |
| Comparative Example 1 | 0.1 C @ 25° C. | No operation |
| Comparative Example 2 | 0.1 C @ 25° C. | No operation |
| Comparative Example 3 | 0.1 C @ 25° C. | No operation |

Experimental Example 2

Stability test was performed on the lithium secondary batteries prepared by using the positive electrodes of Examples 1 to 3 and Comparative Examples 1 to 3 while the lithium secondary batteries were charged at 0.1 C for one hour at a state of charge (SOC) of 100%. In this case, when a voltage of the lithium secondary battery reached 8.4 V without heat generation or explosion, it was evaluated as "Pass", and, when the secondary battery failed to reach the above voltage and generated heat or exploded, it was evaluated as "Fail". Test results are listed in Table 2 below.

TABLE 2

|  | Whether or not passing stability test (1.0 C @ 25° C. evaluation) |
| --- | --- |
| Example 1 | Pass |
| Example 2 | Pass |
| Example 3 | Pass |
| Comparative Example 1 | Fail |
| Comparative Example 2 | Fail |
| Comparative Example 3 | Fail |

Referring to Table 2, since the secondary batteries of Examples 1 to 3 reached 8.4 V without heat generation or explosion, they passed the stability test, but, since Comparative Examples 1 to 3 generated heat or exploded before 8.4 V, the stability test results indicated "Fail". With respect to Comparative Example 2, an oxidation reaction of $Li_2CO_3$ proceeded during overcharge, but, since the $Li_2CO_3$ itself was not consumed or did not disappear, a degree of increasing resistance was insignificant. With respect to Comparative Example 3, since $Li_2C_2O_4$ was included in the single positive electrode material mixture layer, an increase in resistance was smaller than those of Examples 1 to 3 composed of two positive electrode material mixture layers even if the $Li_2C_2O_4$ was consumed or disappeared, and thus, Comparative Example 3 did not reach the above voltage and generated heat or exploded.

The invention claimed is:
1. A lithium secondary battery comprising:
a positive electrode comprising a first positive electrode material mixture layer formed on a positive electrode collector and a second positive electrode material mixture layer formed on the first positive electrode material mixture layer;
wherein the first positive electrode material mixture layer comprises an active material for overcharging which generates lithium and gas during charging, a binder, and a conductive agent,
wherein the active material for overcharging comprises at least one selected from the group consisting of $Li_2C_2O_4$, $Li_2C_4O_4$, $Li_2C_3O_5$, $Li_2C_4O_6$, and $LiN_3$,
wherein the active material for overcharging is included in an amount of 65 wt % to 99.8 wt % based on a total weight of the first electrode material mixture layer,
wherein the binder is included in an amount of 0.1 wt % to 35 wt % based on a total weight of the first positive electrode material mixture layer,
wherein the conductive agent is included in an amount of 0.1 wt % to 35 wt % based on a total weight of the first positive electrode material mixture layer,
wherein the second positive electrode material mixture layer comprises a lithium transition metal oxide comprising $Li_{1+a3}Ni_{x14}Mn_{y3}Co_{z2}M_{v1}O_{(2-c3)}A_{c3}$ where M is any one selected from the group consisting of aluminum (Al), zirconium (Zr), zinc (Zn), titanium (Ti), magnesium (Mg), gallium (Ga), and indium (In) or any combination of elements thereof;
A is at least one selected from the group consisting of phosphorus (P), fluorine (F), sulfur (S), and nitro- gen (N); and $0 \leq x_{14} \leq 1.0$, $0 \leq y_3 < 0.6$, $0 \leq z_2 < 0.6$, $0 \leq v_1 < 0.1$, $0 \leq a_3 < 0.3$, $0 \leq c_3 < 0.2$, and $a_3 + x_{14} + y_3 + z_2 + v_1 = 1$, and a negative electrode comprising a negative electrode collector and a negative electrode active material layer disposed on the negative electrode collector;

wherein the negative electrode active material layer includes a negative electrode active material including a carbonaceous material, a binder and a conductive agent, a separator disposed between the positive electrode and the negative electrode; and an electrolyte comprising an organic solvent and a lithium salt.

2. The lithium secondary battery of claim 1, wherein the active material for overcharging is $Li_2C_2O_4$.

3. The lithium secondary battery of claim 1, wherein the first positive electrode material mixture layer has a thickness of 0.1 μm to 30 μm.

4. The lithium secondary battery of claim 1, wherein the second positive electrode material mixture layer has a thickness of 20 μm to 500 μm.

5. The lithium secondary battery of claim 1, wherein a thickness ratio of the first positive electrode material mixture layer to the second positive electrode material mixture layer is in a range of 1:1 to 1:300.

6. The lithium secondary battery of claim 1, wherein, when the lithium secondary battery is in a state of overcharge, an electrical contact between the positive electrode collector and the second positive electrode material mixture layer is interrupted by structural collapse of the first positive electrode material mixture layer.

\* \* \* \* \*